US009729182B2

(12) United States Patent
Fracchia et al.

(10) Patent No.: US 9,729,182 B2
(45) Date of Patent: Aug. 8, 2017

(54) SENSOR PLATFORM FOR CONTEXT-AWARE EXPERIMENTAL RESEARCH

(71) Applicants: Charles Victor Fracchia, Cambridge, MA (US); Joseph M. Jacobson, Newton, MA (US)

(72) Inventors: Charles Victor Fracchia, Cambridge, MA (US); Joseph M. Jacobson, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/698,840

(22) Filed: Apr. 28, 2015

(65) Prior Publication Data

US 2016/0006813 A1 Jan. 7, 2016

Related U.S. Application Data

(60) Provisional application No. 61/984,986, filed on Apr. 28, 2014.

(51) Int. Cl.
| | |
|---|---|
| *G08C 19/04* | (2006.01) |
| *H04B 1/3827* | (2015.01) |
| *H04B 1/3888* | (2015.01) |
| *H04W 84/18* | (2009.01) |
| *H04B 1/38* | (2015.01) |
| *H04B 5/00* | (2006.01) |

(52) U.S. Cl.
CPC ......... *H04B 1/3827* (2013.01); *H04B 1/3888* (2013.01); *H04B 5/0037* (2013.01); *H04B 5/0075* (2013.01); *H04B 2001/3894* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 2009/0084976 | A1* | 4/2009 | Camilli | H01J 49/24 250/397 |
| 2015/0054654 | A1* | 2/2015 | Albinali | G08B 21/02 340/870.01 |
| 2015/0282364 | A1* | 10/2015 | Moon | H04M 1/18 174/50.51 |

* cited by examiner

*Primary Examiner* — Adolf Dsouza
(74) *Attorney, Agent, or Firm* — Norma E. Henderson

(57) ABSTRACT

A platform for context-aware experimentation includes a housing for one or more sensors for obtaining data pertaining to an on-going experiment, a communications subsystem for transmitting data obtained by the sensors, and a microcontroller for receiving data from the sensors, providing it to the communications subsystem, and possibly controlling the sensors. The housing may be a tube, which may be configured to hold a sample and may have a cap, or a waterproof package, which may have an opening to admit at least part of a sample. The platform may include a power source. The platform may include a computer processor, located outside the housing, for analyzing the data obtained by the sensors, determining the experimental context in which the sensors are operating and/or which experimental step in a protocol is being performed, and/or reminding users of required parameters for the steps in the protocol.

15 Claims, 10 Drawing Sheets

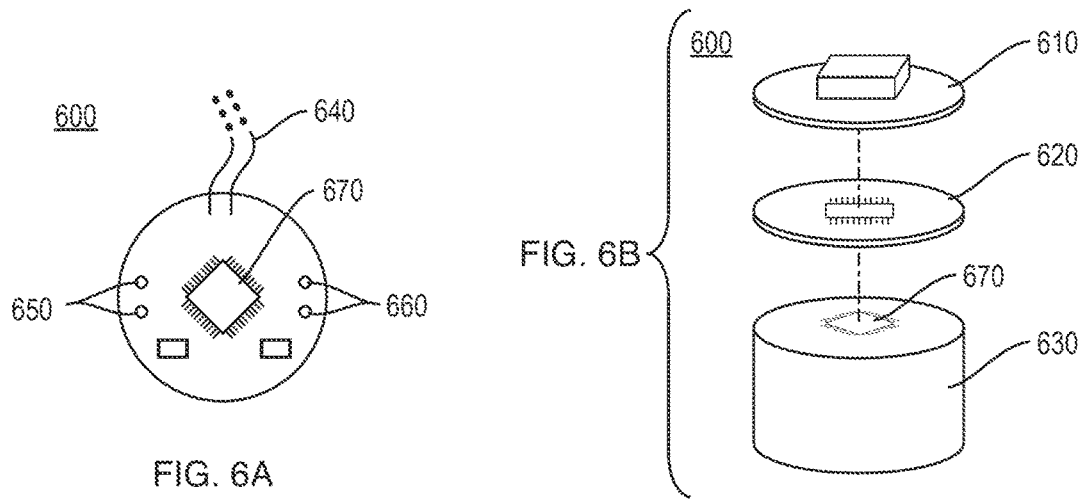
FIG. 6A
FIG. 6B
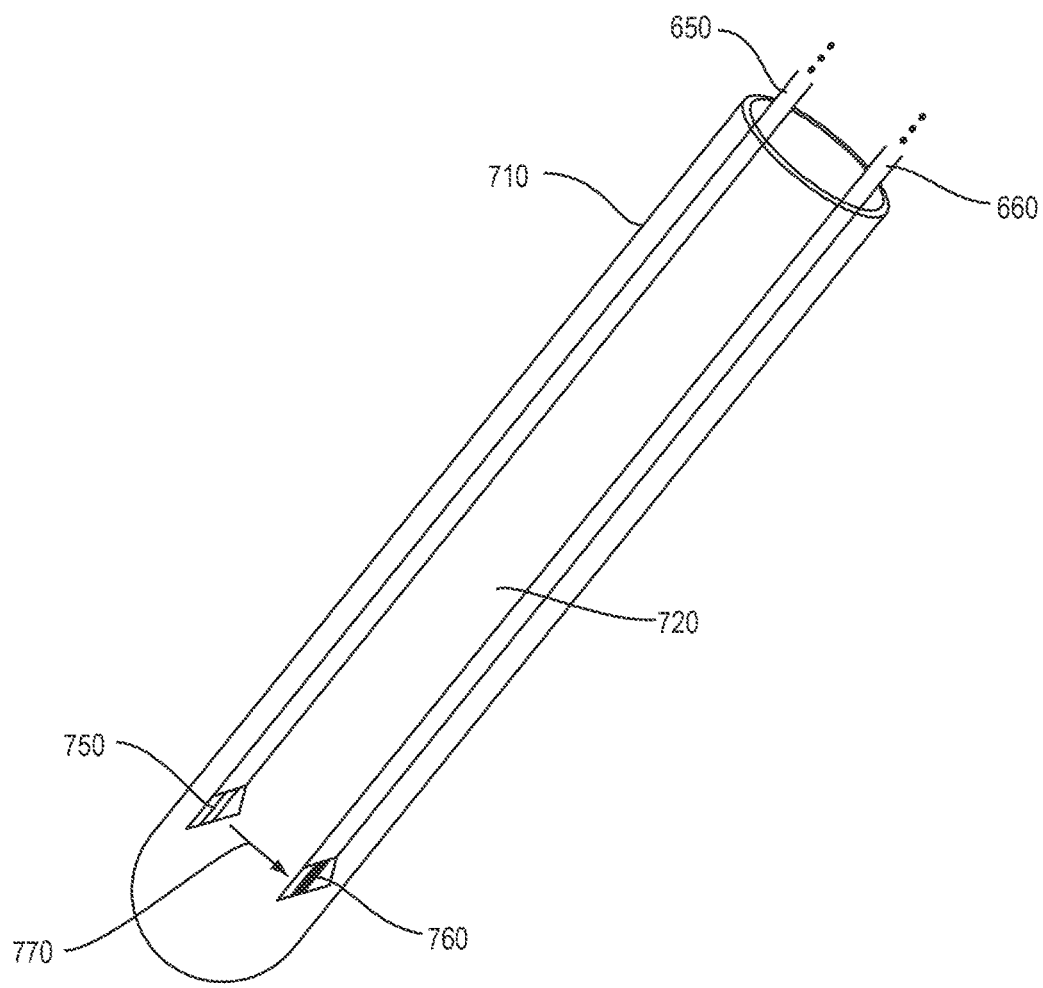
FIG. 7

| | |
|---|---|
| λred Recombination<br>Last run on: 04/24/14<br>Created: 04/20/14<br>Author: Charles Fracchia | 1. Grow overnight culture<br>Grow from fresh monoclonal culture/colony/glycerol stock<br><br>Step 1/45 |
| Mark as Done | 2. Innoculate growth cultures<br>Innoculate 30μL into 30mL<br><br>Step 2/45 |
| 2. Innoculate growth cultures<br>Innoculate 10μL into 30mL<br><br>~~20μL~~ Step 2/45 | 3. Incubate growth cultures<br>Incubate growth cultures with shaking at 34°C until $OD_{600}$=0.4<br>*Current $OD_{600}$: 0.2*<br>Step 3/45 |
| 3. Incubate growth cultures<br>Incubate growth cultures with shaking at 34°C until $OD_{600}$=0.4<br>*Current $OD_{600}$: 0.3*<br>Step 3/45 | 3. Incubate growth cultures<br>Incubate growth cultures with shaking at 34°C until $OD_{600}$=0.4<br>*Current $OD_{600}$: 0.4*<br>Step 3/45 |
| 3. Incubate growth cultures<br>Incubate growth cultures with shaking at 34°C until $OD_{600}$=0.4<br>*Current $OD_{600}$: 0.2 (1 minute ago)*<br>Step 3/45 | Update data now |

FIG. 11

SENSOR PLATFORM FOR CONTEXT-AWARE EXPERIMENTAL RESEARCH

RELATED APPLICATIONS

This application claims the benefit of U.S. Provisional Application Ser. No. 61/984,986, filed Apr. 28, 2014, the entire disclosure of which is herein incorporated by reference.

STATEMENT REGARDING FEDERALLY SPONSORED RESEARCH OR DEVELOPMENT

This invention was made with U.S. government support under Grant No. N660001-10-1-4062, awarded by the Space and Naval Warfare Systems Center, and under Grant No. HR0011-12-1-0003, awarded by the Defense Advanced Research Projects Agency. The government has certain rights in this invention.

FIELD OF THE TECHNOLOGY

The present invention relates to tools for experimental research and, in particular, to sensor platforms.

BACKGROUND

Biomedical research workflows currently suffer from a lack of tools that enable the collection of the experimental context. The multivariate nature of the experimental context makes it difficult to continuously record the evolution of all of the variables over the length of the experiment. As a result, many variables are never recorded, turning the debugging of a failed protocol into a guessing game. This not only makes the discovery of significant experimental variables difficult, but also constitutes the main barrier in training new individuals on these workflows.

The lack of contextual data is a key factor in the current inability to apply a data analytics approach to the biomedical experimental workflow. Currently, the only way to create sufficient data to enable such an approach requires the use of expensive and inflexible automation platforms. These platforms require significant adaptation of user workflows that only make such an investment worthwhile if large numbers of samples are used or if experiments are composed of multiple repeated operations.

Experimental protocols are nominally descriptive of the steps necessary to perform an experiment but often fail to provide all the accessory information crucial to understanding the experiment's context. Currently, experimental protocols are generally described in text documents that are optimized for human readability and comprehension. Their format does not allow easy machine readability, making it very difficult to programmatically extract the context of an experiment. While experimental description schemas have been proposed in the past [e.g. Systems Biology Markup Language, ExptML: A Markup Language for Science], they are optimized for machine readability, making it very hard for experimenters—who often have little experience with programming—to either read or produce them.

SUMMARY

A framework of hardware and software tools can enable context-aware experimentation through the collection, visualization, and analysis of disparate data streams. Together with a distributed sensor network, such a framework can facilitate creation of a comprehensive picture of the experimental context and provide insights to the user, both predictively and within timeframes previously not achievable.

In one aspect, the invention is a hardware platform comprised of sensors, a microcontroller, and a mesh-enabled radio transceiver capable of distinguishing the laboratory context in which it is placed. Using temperature, humidity, $CO_2$, gyroscope, accelerometer sensors, and signal strength from the mesh network radio, a sensor platform according to the invention is able to derive the experimental context it is in. Exemplary form factors for this platform include, but are not limited to, sample tube and biopebble.

In another aspect of the invention, a software architecture is able to leverage the platform's sensed information to determine which experimental step a given user is on. In one implementation, the framework includes a protocol descriptor language that allows the description of experimental workflows and steps.

In one aspect of the invention, a platform for context-aware experimentation includes a housing configured to hold at least some electronic components comprising the platform, one or more sensors located within the housing and configured to obtain data pertaining to at least one parameter related to an on-going experiment, a communications subsystem located within the housing and configured for transmitting data obtained by the sensors, and at least one microcontroller located within the housing and configured for receiving data from the sensors and providing it to the communications subsystem for transmission. The housing may be a tube, which may be configured to hold a sample and may have a tube cap. The housing may be a waterproof package, which may have an opening to admit at least part of a sample. The sensors may include a temperature sensor, optical density sensor, absorbance sensor, accelerometer, gyroscope, pH sensor, humidity sensor, $CO_2$ sensor, and/or conductivity sensor. The microcontroller may be configured to control the sensors. The platform may include a power source, which may be wireless charging circuitry.

In another aspect, the platform may include a communications mesh network located outside the housing and configured for relaying the sensor data from the communications subsystem to a computer processor for analysis. The platform may include a computer processor located outside the housing, the computer processor specially configured for receiving and analyzing the data obtained by the sensors. The computer processor may analyze the received data to determine the experimental context in which the sensors are operating. The computer processor may determine which experimental step in a protocol a particular user is performing, and may remind the user of required timings and other parameters for the steps in the protocol.

BRIEF DESCRIPTION OF THE DRAWINGS

Other aspects, advantages and novel features of the invention will become more apparent from the following detailed description of the invention when considered in conjunction with the accompanying drawings wherein:

FIGS. 6A and 6B are top and side view diagrams, respectively, of the cap of an exemplary implementation of a tube-type optical sensor platform according to an aspect of the invention;

FIG. 7 is an exemplary implementation of a tube-type optical sensor platform according to an aspect of the invention;

FIG. 11 is a screenshot of an exemplary visualization of richly contextualized experimental steps as seen on a wearable visualization device, based on use of a sensor platform according to the invention.

DETAILED DESCRIPTION

A context-aware sensor platform according to one aspect of the invention is comprised generally of one or more sensors, a microcontroller and a mesh-enabled radio transceiver capable of distinguishing the laboratory context in which it is placed. Using environmentally-aware sensors such as, but not limited to, temperature, humidity, $CO_2$, gyroscopes, accelerometers, and signal strength from the mesh network radio or other communications network, the sensor platform can be used to derive the experimental context in which it is operating. Additionally, a software architecture able to leverage the platform's sensed information can be used to determine which experimental step in a protocol a particular user is performing.

In one embodiment of a system employing the platform of the invention, a distributed network of sensors is used to gather contextual information about the experiment being carried out. Experimental data streams of interest may include, but are not limited to, temperature, humidity, carbon monoxide and dioxide, luminosity, serial communication, optical density (OD), pH, and power consumption. These sensors are connected wirelessly to a communication mechanism, which can be accomplished using any of the many means known in the art including, but not limited to, using off the shelf hardware and systems, including, but not limited to, 802.15.4 radios, and traditional WiFi (802.11).

Exemplary form factors for this platform include, but are not limited to, sample tube-based and biopebble-based.

Exemplary Tube-based Sensor Platforms. A tube-based sensor platform according to one implementation of the invention is designed to fit within the body of sample tubes commonly used in biological experiments, such as, but not limited to, Eppendorf tubes and 15 mL and 50 mL Falcon tubes. The electronics typically comprise sensors such as, but not limited, to, temperature, humidity, $CO_2$, gyroscopes, and accelerometers, as well as a low power mesh-enabled radio transmitter. The platform is able to automatically sense and/or identify which operations from the protocol are being carried out by utilizing a wireless connection to protocol context information.

Figure 1A:
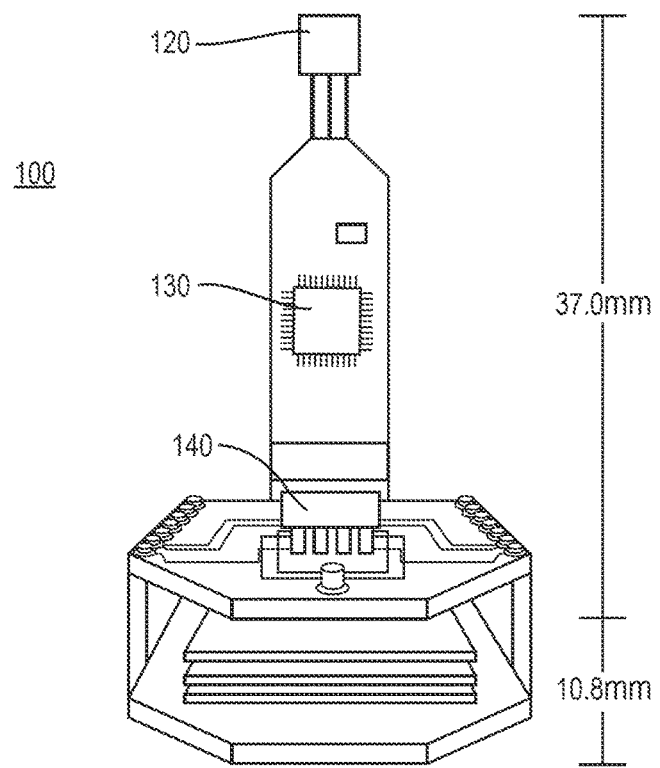
FIG. 1A is an exemplary implementation of a sensor platform according to one aspect of the invention.
Figure 1B:
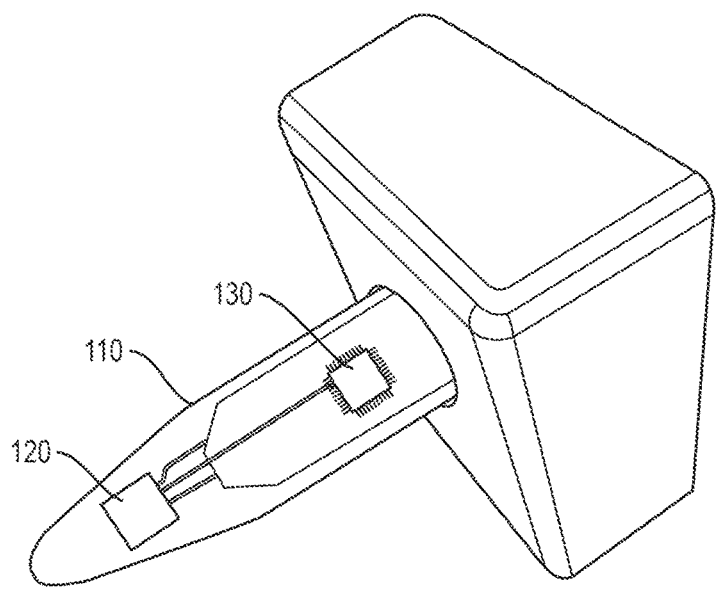
FIG. 1B is the exemplary sensor platform implementation of FIG. 1A in a case, according to another aspect of the invention.

FIGS. 1A and 1B are views of an exemplary implementation of a tube-based sensor platform, with FIG. 1A depicting platform 100 and FIG. 1 B depicting platform 100 of FIG. 1A within outer tube casing 110. In FIG. 1A, sensor 120 is connected to microcontroller 130, which communicates the data obtained by sensor 120 via communications chip 140. It will be clear to one of skill in the art that this is an exemplary implementation only, and that many other configurations of individual parts performing the same or similar functions would be suitable for use in and with the invention, and that the circuit may be used with any type of suitable sensor and corresponding interface.

Figure 2:
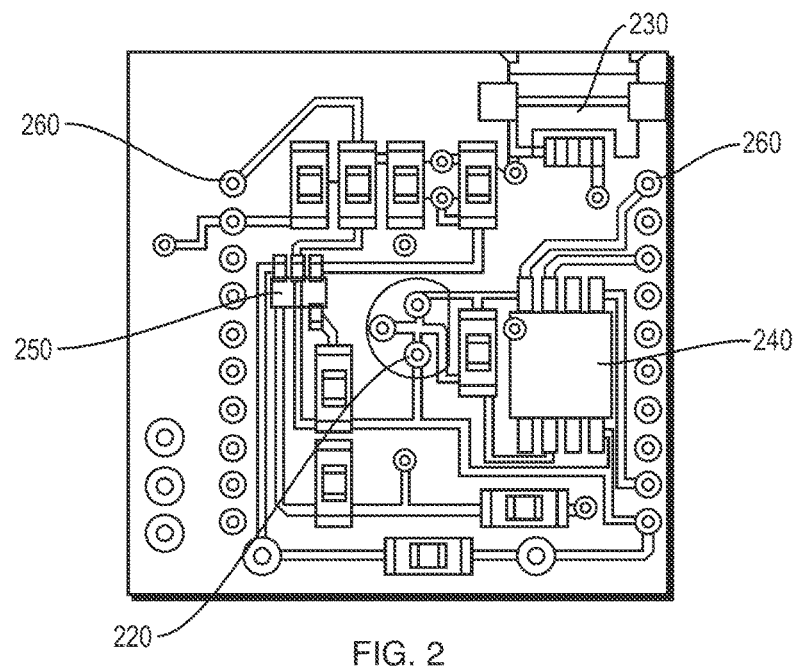
FIG. 2 is a schematic for an exemplary implementation of a printed circuit board for a sensor platform according to one aspect of the invention.

FIG. 2 is a schematic for an exemplary implementation of a printed circuit board for a sensor platform such as the one shown in FIGS. 1A-B. Shown in FIG. 2 are temperature sensor 220 (DS18B20), MicroUSB 230, ATTiny85 240, battery charging integrated circuit 250, and headers for XBee 260. It will be clear to one of skill in the art that this is an exemplary implementation only, and that many other individual parts performing the same or similar functions would be suitable for use in and with the invention.

The temperature sensing platform in an illustrative embodiment makes use of embedded temperature and humidity sensors to derive actions and context from the experimental setup. For example, for samples placed on ice, it is able to distinguish between ice and water mixture, only ice, and dry ice by calculating the derivative of temperature over time and comparing it to pre-calibrated curves embedded in the microcontroller. Similarly, it is able to determine similar information regarding, for example but not limited to, samples placed on hot plate, samples placed in an incubator, samples placed in a freezer, and samples placed in a refrigerator.

Figure 3:
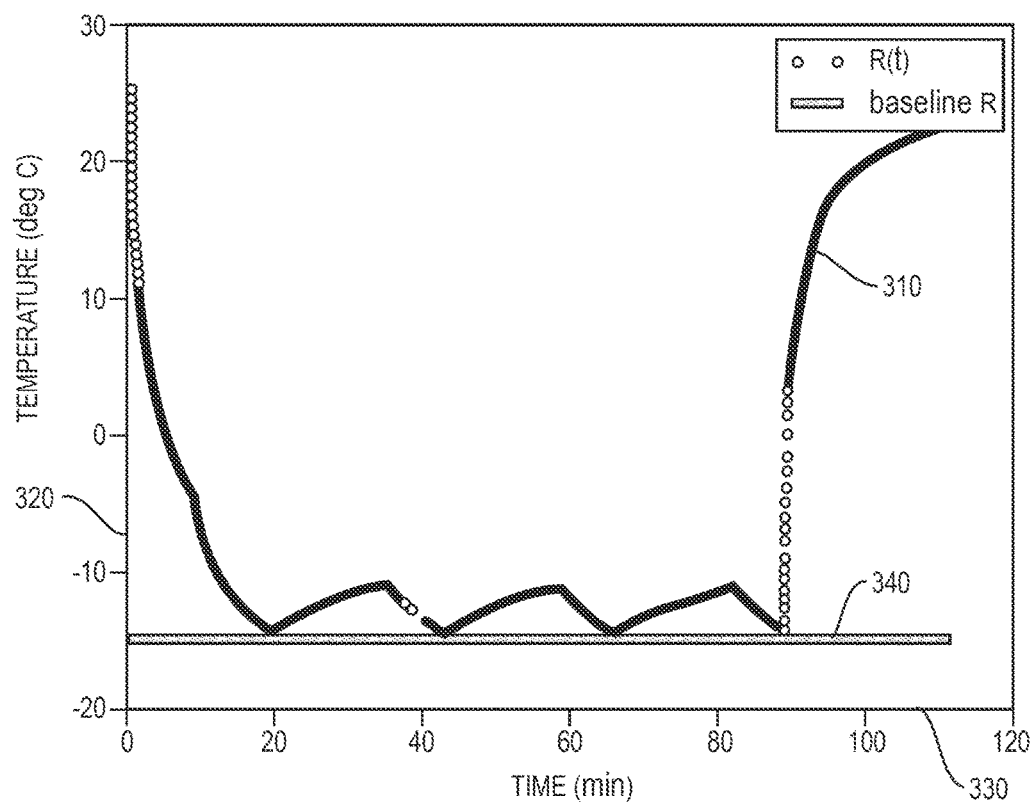
FIG. 3 is a graph of sample temperature data obtained by an exemplary implementation of a temperature sensor platform according to one aspect of the invention when placed in −20° C. freezer.

FIG. 3 is a graph of sample temperature data 310 obtained by an exemplary implementation of a temperature sensor platform according to one aspect of the invention when placed in −20° C. freezer, comparing temperature (degrees C.) 320 over time 330 measured at the platform sensor versus baseline 340.

Using the RSSI reporting of nodes in the mesh network, one embodiment of the system is also able to determine which freezer the sensor was placed in. This feature requires having multiple neighboring nodes and having at least some of their locations be known.

Some embodiments employ motion-activated sensing. This feature uses accelerometer and gyroscope data to automatically discover when the device is being moved and hence there might be data of interest to capture. This method conserves battery power by putting the various components in power saving mode when motion hasn't been detected for a long time. Motion activated sensing can also be used to modify the rate at which sampling from the different sensors occurs.

When present, an on-board gyroscope and accelerometer may particularly be used to determine the rotational speed of the sample tube sensor. This is used to determine rotations per minute (RPM), a variable used when centrifuging or agitating samples. By estimating the RPM of the samples, the system is able to distinguish between agitation RPMs (usually low, in the 100s) and centrifuging RPM usually much higher in the 1000s.

Figure 4:
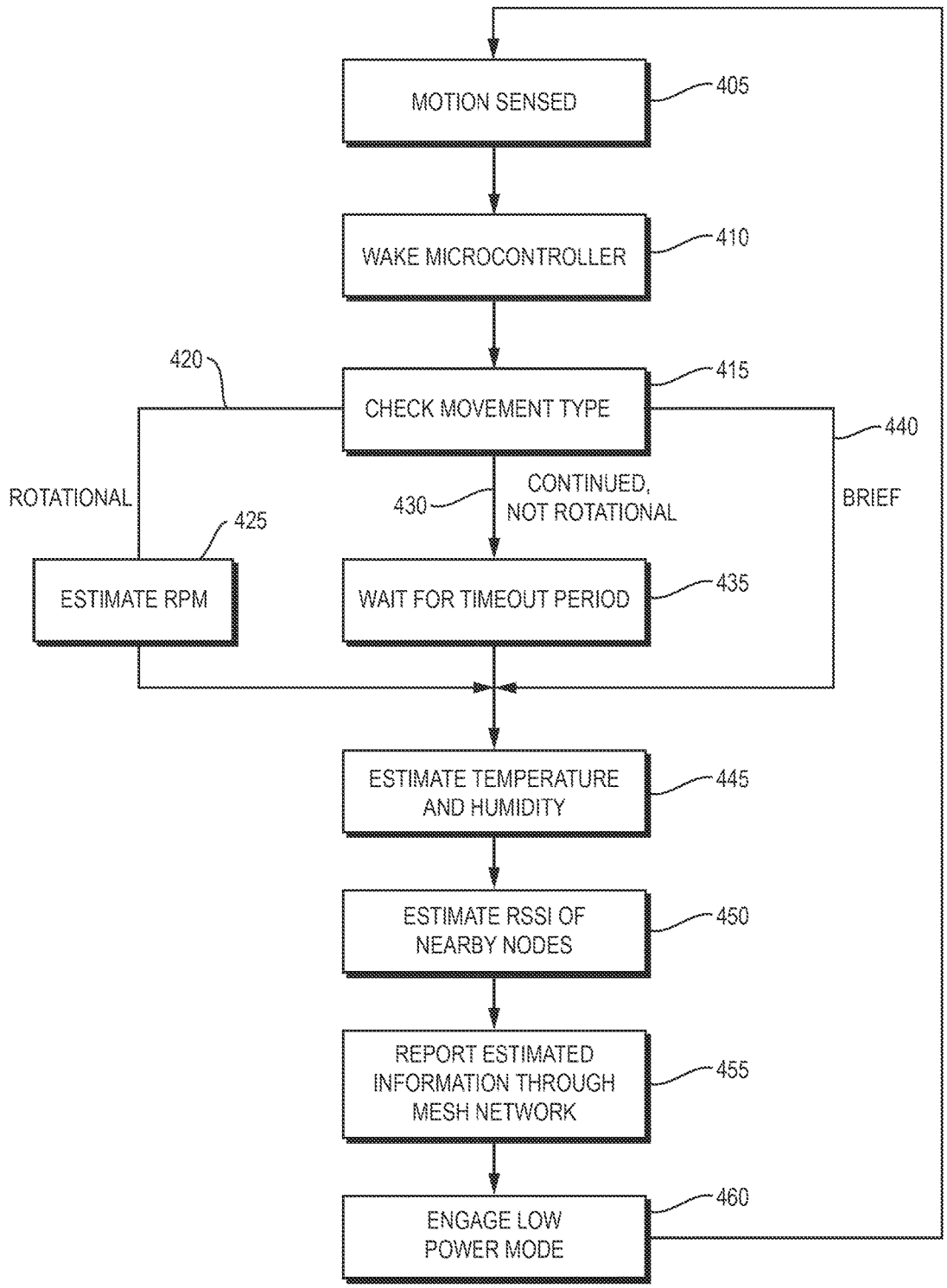
FIG. 4 is a flowchart depicting the operation of an exemplary motion-activated sensor platform, according to one aspect of the invention.

FIG. 4 is a flowchart depicting the operation of an exemplary motion-activated temperature sensor platform, according to one aspect of the invention. As seen in FIG. 4, when motion is sensed 405, the microcontroller is awakened 410 and determined 415 the type of movement detected. If rotational 420, RPM is estimated 420. If the movement is continued and not rotational 430, a wait is instituted 435 for a timeout period. If the movement is brief 440, no motion-specific action is taken. Next, temperature and humidity are estimated 445, RSSI of nearby nodes is estimated 450, estimated information is reported 455 through the mesh network, and the device returns to low power mode 460.

In some embodiments, the sample tube sensor platform is outfitted with a contactless (inductive) charging coil. This allows the user to charge the sensor platform by placing it in a special charging tube rack. The coil has a placement that minimizes the distance to the charging tube rack in order to ensure efficient charging.

In one illustrative embodiment, a temperature sensor is embedded in a sample tube. This design allows experimenters to carry an extra tube and treat it like any other sample, thus creating a proxy for quantifying the variables acting upon the actual samples. In a preferred embodiment, the device has electronics that enable the sensing of temperature, 3-axis movement and acceleration, light, conductivity, and humidity.

Figure 5:
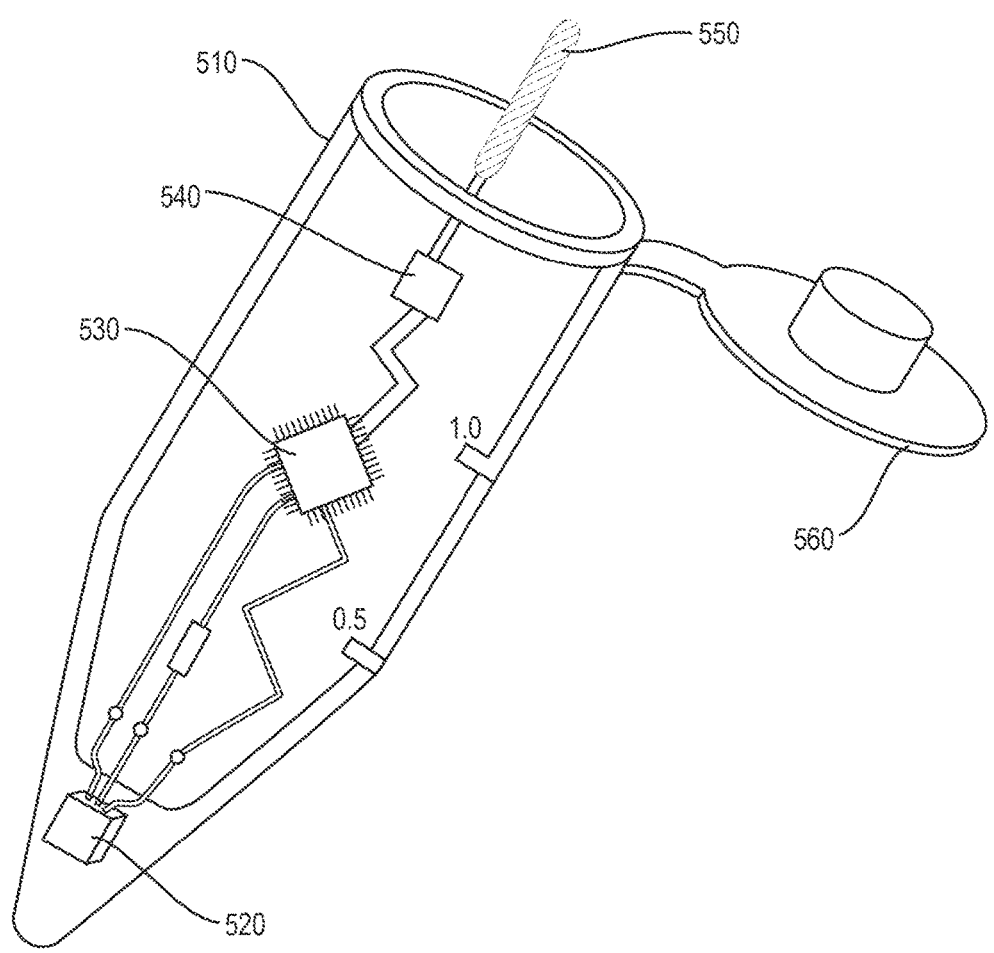
FIG. 5 is an exemplary implementation of a tube-type temperature sensor platform according to an aspect of the invention.

FIG. 5 is an exemplary implementation of a tube-type temperature sensor platform according to this aspect of the invention. Seen in FIG. 5 are sample tube 510, temperature sensor 520, microcontroller 530, communication chip 540, wireless communication antenna 550, and optional cap 560.

Absorbance readings at specific wavelengths can be achieved with the tube sensor platform by including an emission light source and a photo sensor at a fixed distance from each-other. When present, the platform preferably senses the presence of the added sensor and performs calibration in air before being operational.

The electronics may further be coated for hydrophobicity, allowing the sensor to be submerged in a solution to be measured. When plugged in and reporting optical absorbance data, the sensor platform may also record movement information and transmit all information together. This enables the user and the rest of the software platform (off the sensor) to determine the validity of the measurements.

In one illustrative embodiment, an optical density tube sensor provides a new form factor for optical density detection. The embedded electronics design allows the sensor to be embedded within culture tubes, thus facilitating a more scalable approach to continuously monitoring growth curves in biological experiments. Parts of the sensing electronics are made to be both modular for disposal of immersed portions and autoclavable for disinfection. Schematic drawings for an exemplary embodiment of an optical density tube-based sensor are shown in FIGS. 6A-B and 7.

FIGS. 6A and 6B are top and side view diagrams, respectively, of the cap of an exemplary implementation of a tube-type optical sensor platform such as the one shown in FIG. 7. Different layers of the cap 600 have different functionality including communications 610, battery 620, and processing 630. Also seen in FIGS. 6A and 6B are battery connection 640, photo emitter connection 650, photosensor connection 660, and processor 670.

FIG. 7 is an exemplary implementation of a tube-type optical sensor platform usable with the cap of FIGS. 6A-B. Seen in FIG. 7 are tube 710, growth medium 720 for/with cell cultures, photoemitter 750, photosensor 760, light path 770, photo emitter connection 650 (FIG. 6A), and photosensor connection 660 (FIG. 6A).

Exemplary BioPebble-Embedded Sensor Platform. The BioPebble sensor platform is a collection of sensors packed in a small waterproof footprint. The novel form factor of the pebble allows it to be dropped directly inside of the solution to be measured. The enclosure is both waterproof and chemically inert. The BioPebble has an embedded coil or antenna that enables short range communication and power transfer. A preferred embodiment of the pebble is electronically passive, extremely low power, and powered wirelessly from an external device. The pebble has embedded sensors that may include, for example, but are not limited to, temperature, conductivity, pH, and optical density at various wavelengths.

Figure 8:
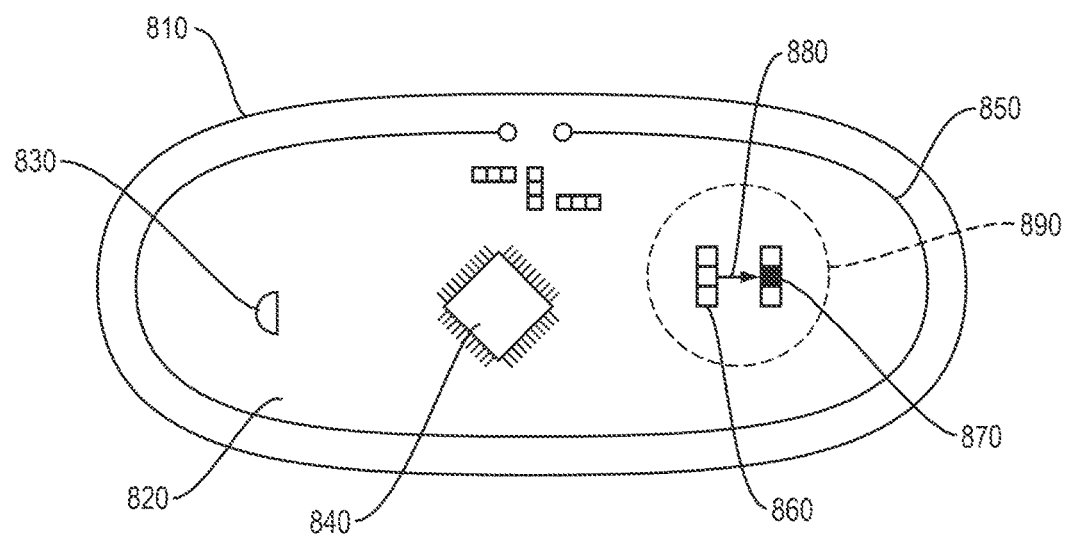
FIG. 8 is an exemplary implementation of a biopebble-type multi-sensor platform according to an aspect of the invention.

FIG. 8 is an exemplary implementation of a biopebble-type multi-sensor platform. Shown in FIG. 8 are biopebble enclosure 810, electronic board 820, which is inside enclosure 810 and supports sensor 830, processing unit 840, RFID coil or antenna 850, photo emitter 860, photodetector 870, and light path 880, plus enclosure opening 890 that permits liquid to reach photodetector 870.

A complete context-aware experimentation system is preferably aware of which user is present in the lab and interacting with different parts of the system, which is typically accomplished using RFID readers and assorted tags or other identifying technologies, such as, but not limited to, video cameras. Software has been designed to determine which experimental step the user is performing. Using information provided by the sensor platform, the software evaluates statistically the likelihood of a user being at a given step of a described experiment.

Figure 9:
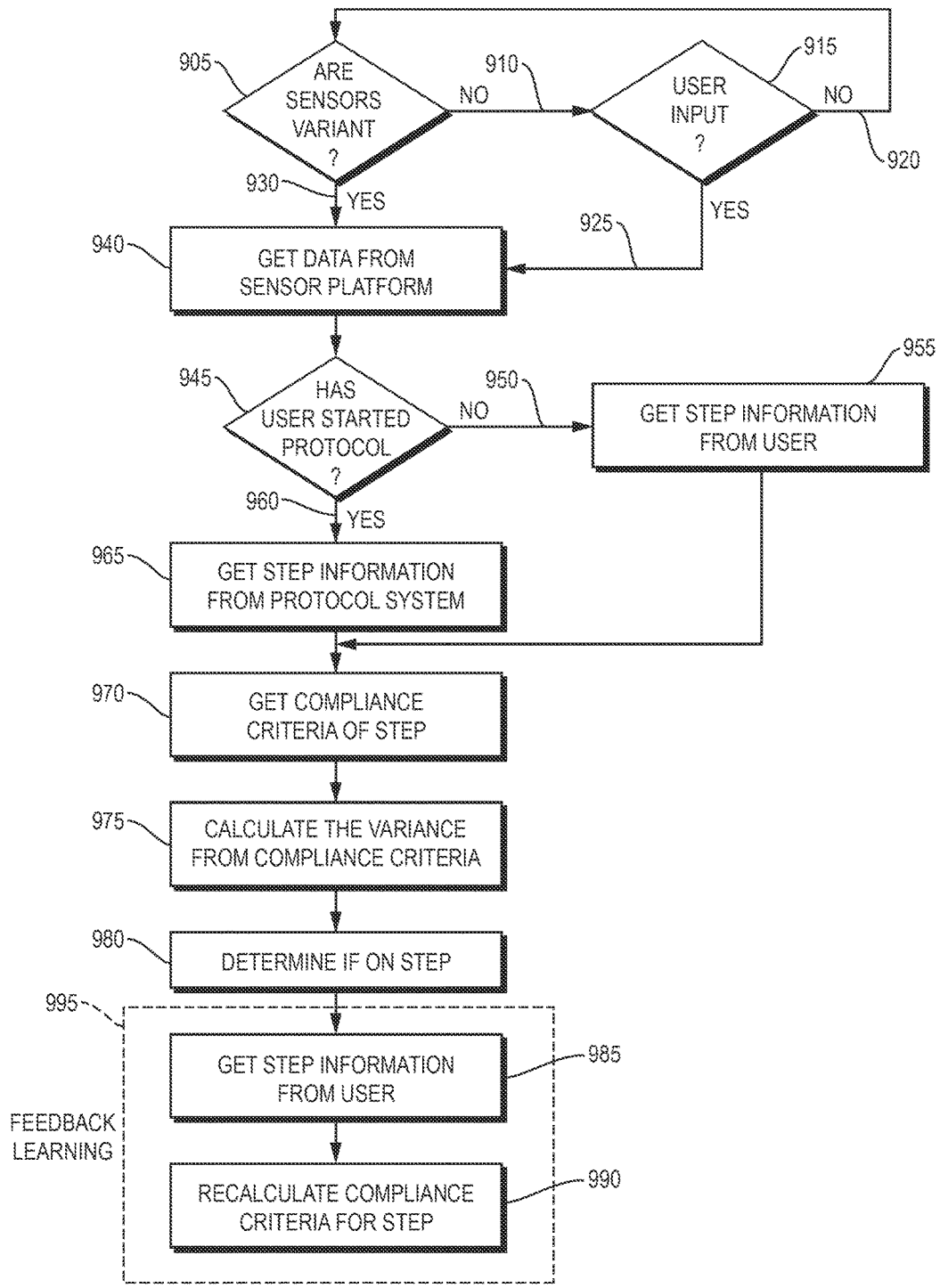
FIG. 9 is a flowchart depicting an exemplary implementation of the process of determining the experimental step a user is performing using a sensor platform according to the invention.

The logic for determining the step a user is performing using a sensor platform according to the invention is shown in FIG. 9, which is a flowchart depicting an exemplary implementation of the process. As shown in FIG. 9, a determination is made as to whether the sensors are variant 905. If not 910, a check is made for user input 915. If none 920, the system returns to check if sensors are variant 905. If there is user input 925, or sensors are variant 930, data is obtained 940 from the sensor platform, and a check is made for a user-started protocol 945. If the user has not 950 started a protocol, step information is obtained 955 from the user. If the user has 960 started a protocol, step information is obtained 965 from the protocol system. Compliance criteria for the step are obtained 970, variance from the compliance criteria is determined 975, and a determination is made of whether or not the step is "on step" 980. Finally, step information is obtained 985 from the user, and compliance criteria for the step are recalculated 990, which two processes provide a feedback learning mechanism 995 for the system.

A protocol descriptor language has been developed that permits the incorporation of high-resolution contextual information in a way that is highly readable by the experimenter. This allows the system to display this contextual information in a "just-in-time" fashion. This protocol descriptor language aims to strike a balance between machine readability and human compatibility.

The protocol descriptor language lists out the steps for carrying out the experiment. Required fields include an ordered or indexed list of steps and their respective duration. The descriptor language also includes optional fields that greatly enhance its function. These include, but need not be limited to, a field for programming the behavior of the system at the end of each step, such as gathering data, modifying sensing intervals, or modifying the experimental setup. An exemplary protocol is set forth in Table 1.

TABLE 1

```
<protocol>
 <id></id>
 <name>λred Recombination</name>
 <description>Transform plasmid into E. coli cells</description>
 <created></created>
 <relationship></relationship>
 <steps>
  <step>
   <number>1</number>
   <name>Grow overnight culture</name>
   <description>Grow from fresh monoclonal culture/colony/glycerol stock</description>
   <intensity></intensity>
   <duration>12h10m45s</duration>
   <data>Optional</data>
  </step>
  <step>
   <number>2</number>
   <name>Innoculate growth cultures</name>
   <description>Innoculate 30µL into 30mL</description>
   <intensity>1</intensity>
   <duration>10m</duration>
   <data>Optional</data>
  </step>
  <step>
   <number>3</number>
   <name>Incubate growth cultures</name>
   <description>Incubate growth cultures with shaking at 34°C until OD600=0.4</description>
   <intensity>1</intensity>
   <duration>45m</duration>
   <data>Optional</data>
  </step>
  <step>
   <number>4</number>
   <name>Heat shock the culture</name>
   <description>Immediately heat shock the culture in a 42°C water bath with shaking for 15 minutes</description>
   <intensity>5</intensity>
   <duration>15m</duration>
   <data></data>
  </step>
  <step>
   <number>5</number>
   <name>Ice transformed cells</name>
   <description>Immediately put transformed cells on {ice} and move to the cold room</description>
   <intensity>5</intensity>
   <duration>15m</duration>
   <data>Optional</data>
  </step>
  <step>
   <number>6</number>
   <name>Move cells to Eppendorf tubes</name>
   <description>Move 1mL of cells into eppendorf tubes</description>
   <intensity>5</intensity>
   <duration>5m</duration>
   <data>Optional</data>
  </step>
  <step>
   <number>7</number>
   <name>Wash cells 1/2</name>
   <description>Wash cells in 1mL of {cold} ultrapure distilled water</description>
   <intensity>2</intensity>
   <duration>5m</duration>
   <data>Optional</data>
  </step>
  <step>
   <number>8</number>
   <name>Spin cells down</name>
   <description>Spin cells at 16.1rcf for 20 seconds</description>
   <intensity>2</intensity>
```

TABLE 1-continued

```
   <duration>45s</duration>
   <data>Optional</data>
  </step>
  <step>
   <number>9</number>
   <name>Wash cells 2/2</name>
   <description>Wash cells in 1mL of {cold} ultrapure distilled water</description>
   <intensity>2</intensity>
   <duration>5m</duration>
   <data>Optional</data>
  </step>
  <step>
   <number>10</number>
   <name>Spin cells down</name>
   <description>Spin cells at 16.1rcf for 20 seconds</description>
   <intensity>2</intensity>
   <duration>45s</duration>
   <data>Optional</data>
  </step>
 </steps>
</protocol>
```

While the example given in Table 1 uses XML, the protocol descriptor language is agnostic of the lower layer format. Versions of the descriptor language based on JSON have also been implemented. The protocol descriptor language not only describes the different steps necessary to carrying out the experimental operations, but also has provisions for requesting data and actuating the distributed sensor network. The protocol descriptor language also allows storage of contextual data. This enables each file to become an instantiation of that protocol as it was run that day. This enables portability and shareability of the protocol that enables the comparison of multiple protocols downstream using analysis tools.

Visualization and analysis platform. Web-based interfaces for the display of time-varying experimental information, such as protocol steps and contextual sensory information, have been developed. Exemplary implementations of the visualizations have been created using Node.js and the d3 visualization library. When using the protocol descriptor language, relative time (e.g.: 15 minutes) is used, since the duration of steps is dependent on the others. The software calculates these offsets and produces the chart shown in FIG. 10.

Figure 10:
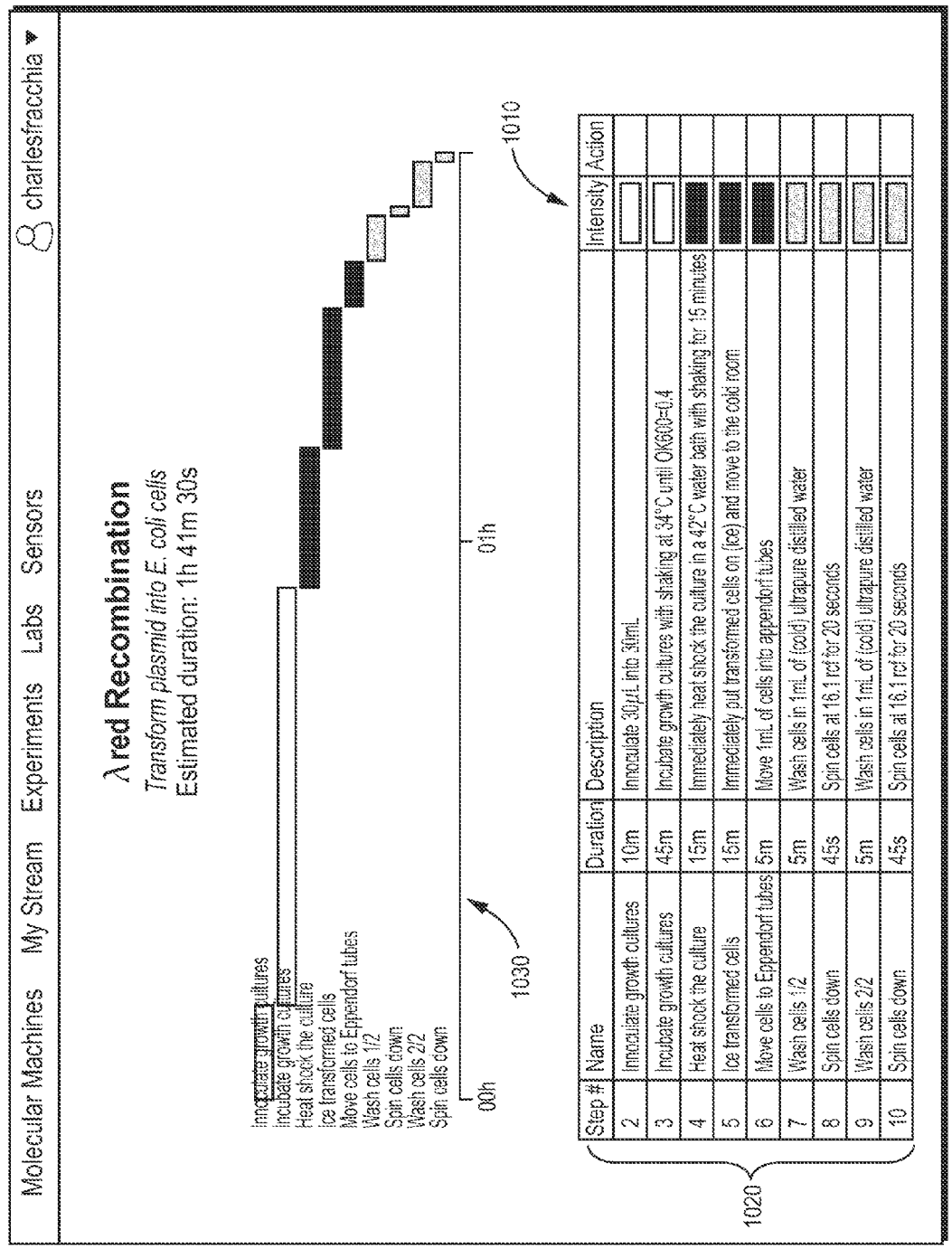
FIG. 10 is a screenshot of an exemplary implementation of a protocol follower interface useable with a sensor platform according to the invention.

FIG. 10 is a screenshot of an exemplary implementation of a protocol follower interface useable with a sensor platform according to the invention. It highlights the intensity 1010 of each step 1020 using colors to enable the experimenter to plan their time accordingly, such as avoiding breaks or distractions near steps 1020 that require critical timing. In FIG. 10, "Intensity" is an indicator of (a) the criticality of a step, (b) the precision of timing required for a step, (c) the amount of attention required from the human experimenter, or (d) the difficulty of a step. Steps 1020 are displayed in order, and also shown on a timeline 1030. In alternative implementations of this interface, the "intensity" parameter may be replaced with two or more parameters such as, but not limited to, criticality, precision of timing, amount of attention required, or difficulty.

These visualizations enable the display of implicit information, as well as sensor contextual information, "just-in-time" to the user. In order to achieve this goal, the visualization system was extended to a range of devices that are wearable, such as, but not limited to, Google Glass™ and Pebble Watch.

FIG. 11 is a screenshot of an exemplary visualization of richly contextualized experimental steps as seen on a wearable visualization device (Google Glass™), based on use of a sensor platform according to the invention. The different screenshots show the ability to embed sensor data in real time and make decisions as to the progress of the protocol based on the criteria set out in the protocol description file.

Figure 12:
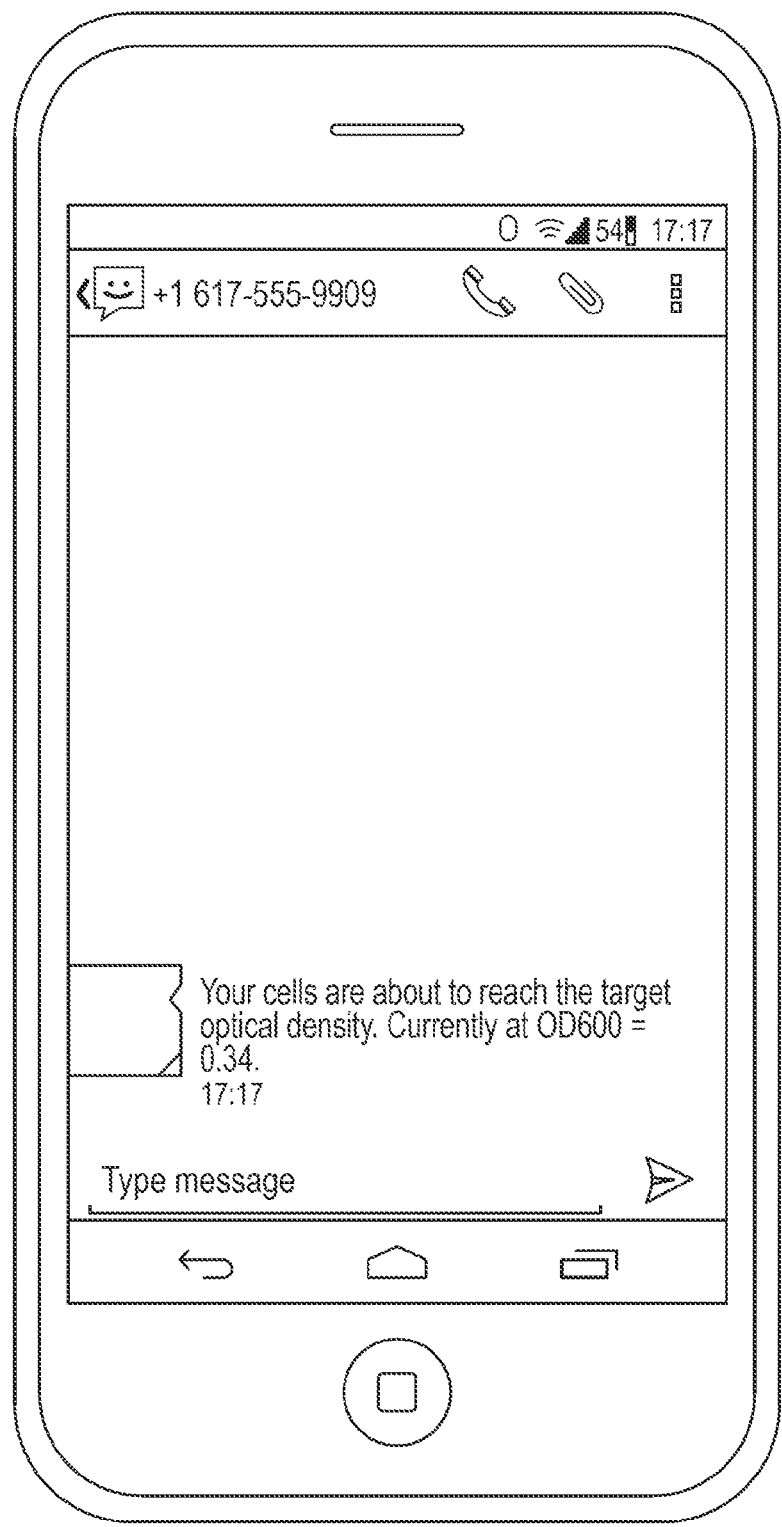
FIG. 12 is a screenshot of an exemplary text message notifying the user of the timing requirements of important experimental steps, triggered by data received from a sensor platform according to the invention.

FIG. 12 is a screenshot of an exemplary text message notifying the user of the timing requirements of important experimental steps, and is triggered by data received from a sensor platform according to the invention. This assists the user in performing steps that, for example, if missed, might significantly delay or affect the result of the experiment.

The framework provided by the various aspects of the invention permits aggregation and analysis of multivariate sensor data to determine multidimensional states and take appropriate action. These actions include, but are not limited to, notifying the user (FIGS. 11 and 12), modifying the data collection behavior of the sensor network, or even modifying the experimental variables (such as, for example, but not limited to, temperature or agitation rate).

While several illustrative embodiments are disclosed, many other implementations of the invention will occur to one of ordinary skill in the art and are all within the scope of the invention. Furthermore, each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A platform for context-aware experimentation, comprising:
   at least one sensor platform, comprising:
      a housing, the housing being configured to hold at least some electronic components comprising the sensor platform;
      at least one sensor located within the housing, the sensor being configured for obtaining data pertaining to at least one parameter related to an on-going experiment;
      a communications subsystem located within the housing, the communications subsystem being configured for transmitting, in real-time, data obtained by the at least one sensor to a computer processor located outside the housing; and
      at least one microcontroller located within the housing, the microcontroller being connected to the at least one sensor and the communications subsystem and being configured for receiving data from the at least one sensor and providing it, in real-time, to the communications subsystem for transmission; and
   a computer processor located outside the housing, the computer processor specially configured for:
      receiving, in real-time from the communications subsystem, and analyzing, in real-time, the data obtained by the at least one sensor;
      determining, in real-time, from the received data, the experimental context in which the at least one sensor is operating;
      determining, in real-time, based on the determined experimental context and the received data, which experimental step in a protocol a particular user is performing; and
      reminding the user, in real-time, of upcoming required timings and other parameters for executing the steps in the protocol.

2. The platform of claim 1, wherein the housing is a tube.

3. The platform of claim 2, wherein the tube is further configured to hold a sample.

4. The platform of claim 2, further comprising a tube cap.

5. The platform of claim 1, wherein the housing is a waterproof, chemically inert package.

6. The platform of claim 5, wherein the waterproof package has an opening to admit at least part of a sample.

7. The platform of claim 1, wherein each of the at least one sensor is selected from the group consisting of: temperature sensor, optical density sensor, absorbance sensor, accelerometer, gyroscope, pH sensor, humidity sensor, $CO_2$ sensor, and conductivity sensor.

8. The platform of claim 1, wherein the microcontroller is further configured for controlling the at least one sensor.

9. The platform of claim 1, further comprising power source located within the housing.

10. The platform of claim 9, wherein the power source comprises wireless charging circuitry.

11. The platform of claim 1, further comprising a communications mesh network located outside the housing and configured for relaying, in real-time, the sensor data from the communications subsystem to the computer processor for analysis.

12. The platform of claim 11, wherein the computer processor is further specially configured for receiving and analyzing, in real-time, data obtained from the communications mesh network about the location of at least one sensor.

13. The platform of claim 12, wherein the computer processor is further specially configured for receiving and analyzing, in real-time, data obtained from the communications mesh network about the location of at least one user.

14. The platform of claim 1, wherein the computer processor is further configured to receive user input about at least one experimental step in a protocol.

15. The platform of claim 14, wherein the computer processor is further configured to receive, from the user, information about required timings and other parameters for the steps in the protocol.

* * * * *